(12) United States Patent
Lehtinen

(10) Patent No.: US 11,418,311 B2
(45) Date of Patent: Aug. 16, 2022

(54) DUPLEX FILTER ARRANGEMENT WITH LEAKAGE CANCELLATION

(71) Applicant: Huawei Technologies Co., Ltd., Shenzhen (CN)

(72) Inventor: Teijo Henrikki Lehtinen, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/036,862

(22) Filed: Sep. 29, 2020

(65) Prior Publication Data

US 2021/0075582 A1   Mar. 11, 2021

Related U.S. Application Data

(63) Continuation of application No. PCT/EP2018/058909, filed on Apr. 6, 2018.

(51) Int. Cl.
*H04L 5/14* (2006.01)
*H04B 1/00* (2006.01)

(52) U.S. Cl.
CPC ............... *H04L 5/14* (2013.01); *H04B 1/006* (2013.01); *H04B 1/0057* (2013.01); *H04B 1/0067* (2013.01)

(58) Field of Classification Search
CPC .... H04B 1/0053; H04B 1/0057; H04B 1/006; H04B 1/0067; H04B 1/50; H04B 1/525; H04L 5/14

(Continued)

(56) References Cited

U.S. PATENT DOCUMENTS 5,835,990 A    11/1998  Saw et al.
7,915,972 B2   3/2011   Tajima et al.
(Continued)

FOREIGN PATENT DOCUMENTS

CN    101136621 A    3/2008
CN    103607235 A    2/2014
(Continued)

OTHER PUBLICATIONS

Din, I.U. et al., "Two Tunable Frequency Duplexer Architectures for Cellular Transceivers," IEEE Transactions on Circuits and Systems—I: Regular Papers, vol. 64, No. 11, Nov. 2017, 12 pages.
(Continued)

*Primary Examiner* — Young T. Tse
(74) *Attorney, Agent, or Firm* — Slater Matsil, LLP

(57) ABSTRACT

A frequency-division duplex communication apparatus, including a first radio frequency port, a second radio frequency port coupled to an antenna, a third radio frequency port, a fourth radio frequency port coupled to a balancing circuit, and a filtering arrangement having filters of a first type, a filter of a second type and a filter of a third type. The filters of the first type pass signals at a first frequency band and reject signals at a second frequency band. The filter of the second type rejects signals at the first frequency band and passes signals at the second frequency band. The filter of the third type rejects signals at the first frequency band and passes signals at the second frequency band and the phase response of the filter of the second type is 180 degrees from the phase response of the filter of the third type.

15 Claims, 10 Drawing Sheets

(58) Field of Classification Search
USPC ......... 375/219, 257–259, 285; 370/278, 281, 370/282, 295; 455/59, 84
See application file for complete search history.

(56) References Cited

U.S. PATENT DOCUMENTS

| | | | | |
|---|---|---|---|---|
| 9,036,304 | B1* | 5/2015 | Galbraith | G11B 5/4886 360/246.6 |
| 2008/0238789 | A1* | 10/2008 | Wilcox | H04B 1/0458 343/750 |
| 2013/0083703 | A1* | 4/2013 | Granger-Jones | H03H 7/01 370/277 |
| 2013/0176912 | A1 | 7/2013 | Khlat | |
| 2015/0156005 | A1* | 6/2015 | Sjoland | H04B 1/582 370/278 |
| 2016/0043767 | A1* | 2/2016 | Andersson | H04B 1/525 370/278 |
| 2016/0065352 | A1 | 3/2016 | Sjoland et al. | |
| 2016/0072542 | A1* | 3/2016 | Din | H04B 1/40 370/295 |
| 2016/0294436 | A1 | 10/2016 | Din et al. | |
| 2017/0005696 | A1* | 1/2017 | Sjoland | H04B 1/525 |
| 2018/0062985 | A1* | 3/2018 | Iwasaki | H04L 45/60 |

FOREIGN PATENT DOCUMENTS

| | | |
|---|---|---|
| CN | 105099586 A | 11/2015 |
| CN | 106027075 A | 10/2016 |
| EP | 3301753 A1 | 4/2018 |

OTHER PUBLICATIONS

Van Liempd, B. et al., "An Electrical-Balance Duplexer for In-Band Full-Duplex with <−85dBm In-Band Distortion at +10dBm TX-Power," IEEE, 2015, 4 pages.

* cited by examiner

DUPLEX FILTER ARRANGEMENT WITH LEAKAGE CANCELLATION

CROSS-REFERENCE TO RELATED APPLICATIONS

This application is a continuation of International Application No. PCT/EP2018/058909, filed on Apr. 6, 2018, the disclosure of which is hereby incorporated by reference in its entirety.

TECHNICAL FIELD

The present application relates to the field of duplex filters. More particularly, the present application relates to a duplex filter arrangement with leakage cancellation.

BACKGROUND

Transceivers comprise both a transmitter and a receiver, and they are commonly used in a variety of communication apparatuses. Transceivers may be operated in full duplex, i.e. the receiver and transmitter operate simultaneously, and some arrangements are provided to prevent the transmitter from concealing the received signal. One approach to achieve this is to assign different frequencies for transmission and reception. This approach is therefore commonly referred to as frequency division duplex (FDD).

As different communication bands are supported in different countries, the number of FDD bands that a wireless device should support is large and growing quickly. Supporting tens of bands using discrete duplex filter components results in a large and expensive solution. One possible solution for supporting the numerous FDD bands is to use discrete filters integrated into a front-end module (FEM). Further, normally the discrete filter components are integrated into the FEM, but then the FEM becomes very complex and expensive.

There is a need for an improved duplex filter solution that would enable, for example, at least one of the following: supporting multiple bands, lowering costs, and minimizing an in-band loss.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object of the invention to provide a duplex filter arrangement for frequency-division duplex communication. The duplex filter arrangement comprises a filtering arrangement that comprises filters of a first type, a filter of a second type and a filter of a third type. The filters are configured so that some of the filters are configured to pass signals at a first frequency band and reject signals at a second frequency band, and some of the filters are configured to reject signals at the first frequency band and pass signals at the second frequency band. Additionally, the filters of the second type and the third type are configured so that the phase response of the filter of the second type differs at the first frequency band and at the second frequency band substantially 180 degrees from the phase response of the filter of the third type. This enables implementing a duplex filter arrangement without using additional baluns that cause transmitter and receiver losses.

This objective is achieved by the features of the independent claims. Further embodiments and examples of the invention are apparent from the dependent claims, the description and the figures.

According to a first aspect, a duplex filter arrangement for frequency-division duplex communication is provided. The duplex filter arrangement comprises a first radio frequency port, a second radio frequency port configured to be connected to an antenna, a third radio frequency port and a fourth radio frequency port configured to be connected to a balancing circuit. The duplex filter arrangement further comprises a filtering arrangement comprising filters of a first type, a filter of a second type and a filter of a third type The filters of the first type are configured to pass signals at a first frequency band and reject signals at a second frequency band, and wherein a first filter of the filters of the first type is connected between the first radio frequency port and the second radio frequency port and a second filter of the filters of the first type is connected between the third radio frequency port and fourth radio frequency por. Further, the filter of the second type is configured to reject signals at the first frequency band and pass signals at the second frequency band, and wherein the filter of the second type is connected between the third radio frequency port and the second radio frequency port. The filter of the third type is configured to reject signals at the first frequency band and pass signals at the second frequency band, and the filter of the third type is connected between the first radio frequency port and the fourth radio frequency port. Further, the phase response of the filter of the second type differs at the first frequency band and at the second frequency band substantially 180 degrees from the phase response of the filter of the third type. This enables a solution that does not comprise additional baluns, which reduces both transmitter and receiver losses. Further, the solution enables a tunable duplex filter supporting multiple bands. The disclosed duplex filter arrangement also enables lower cost filters, or filters that minimize an in-band loss while compromising the isolation, which is then improved using the arrangement. Further, in some cases, for example, in a small cell base station, the duplex filter arrangement may be used to improve transmitter-receiver isolation more than prior solutions.

In an implementation, transformer equivalent circuits are embedded into the filters of the second and third types, and therefore there is no extra loss due to the transformers. Further, the transformer loss does not depend on the transformer coupling coefficient, since the coupling is included in the equivalent circuit. Further, the transformers may be loosely coupled, which minimizes the transformer parasitics. Especially the capacitance between the primary and secondary loops can be negligible in a loosely coupled transformer, which improves the achievable transmitter-receiver isolation, since the capacitively coupled leakage through the transformers is not cancelled in the duplexer. Additionally, the reduced amount of parasitics may simplify the transformer design. Further, it may be possible to use thicker and wider metals in loosely coupled transformers than tightly coupled transformers thus reducing loss.

In an implementation form of the first aspect, the first frequency band comprises a transmitter frequency band and the second frequency band comprises a receiver frequency band, and the first radio frequency port is configured to be connected to a transmitter and the third radio frequency port is configured to be connected to a receiver.

In a further implementation form of the first aspect, the first frequency band comprises a receiver frequency band and the second frequency band comprises a transmitter frequency band, and the first radio frequency port is configured to be connected to a receiver and the third radio frequency port is configured to be connected to a transmitter.

In a further implementation form of the first aspect, at least one filter of the filters of the first, second and third type comprise tunable circuit elements, wherein the tunable circuit elements are used to provide multiple frequency bands.

In a further implementation form of the first aspect, at least one filter of the filters of the first, second and third type comprises a surface acoustic wave filter or a bulk acoustic wave filter. By using the duplex filter arrangement with the surface acoustic wave filter or the bulk acoustic wave filter requirements becomes easier, so that lower fabrication costs, easier fabrication, and/or lower pass-band insertion loss may be achieved.

In a further implementation form of the first aspect, the duplex filter arrangement further comprises a plurality of multiplexers and a plurality of filtering arrangements. Each filtering arrangement provides a separate frequency band, and a different multiplexer is associated with each one of the first radio frequency port, the second radio frequency port, the third radio frequency port and the fourth radio frequency port. Further, each multiplexer of the plurality of multiplexers provides each filtering arrangement of the plurality of filtering arrangements with a connection to one radio frequency port. This enables implementing the duplex filter arrangement using integrated passive electrical components (for example, capacitors, inductors, transformers, instead of acoustic electromechanical devices), and the filtering arrangements can be easily integrated on single chip, which is very cost-effective.

In a further implementation form of the first aspect, each filter of the first type comprises a group of filter elements and two multiplexers connected to each filter element, the multiplexers being configured to select one filter element a time, and wherein each filter element is configured to support a separate frequency band. This enables, for example, a solution where the filter of the first type may have tighter requirements, while the filters of the second type and the third type may have easier requirements and thus can be made tunable to support multiple frequency bands.

In a further implementation form of the first aspect, the filter of the second type comprises a group of filter elements and two multiplexers connected to each filter element, the multiplexers being configured to select one filter element at a time, and wherein each filter element is configured to support a separate frequency band; and the filter of the third type comprises a group of filter elements and two multiplexers connected to each filter element, the multiplexers being configured to select one filter element at a time, and wherein each filter element is configured to support a separate frequency band.

In a further implementation form of the first aspect, the multiplexers are implemented using multiple chips.

In a further implementation form of the first aspect, the multiplexers are integrated on a single chip.

In a further implementation form of the first aspect, the filtering arrangement(s) is implemented using multiple chips.

In a further implementation form of the first aspect, the filtering arrangement(s) is implemented on a single chip.

In a further implementation form of the first aspect, the duplex filter arrangement further comprises an antenna and a balancing circuit. The antenna is connected to the second radio frequency port and the balancing circuit is connected to the fourth radio frequency port. An impedance of the balancing circuit seen at the fourth radio frequency port replicates an impedance of the antenna seen at the second radio frequency port. In other words, the impedance at the fourth radio frequency port is at least substantially equal to an impedance at the second radio frequency port.

According to a second aspect, there is provided a transceiver arrangement comprising a transmitter, a receiver, an antenna, a balancing circuit and the duplex filtering arrangement of the previous further implementation form of the first aspect. The transmitter is connected to one of the first radio frequency port and the third radio frequency port and the receiver is connected to the other one of the first radio frequency port and the third radio frequency port.

According to a third aspect, there is provided a wireless device comprising a duplex filter arrangement of the first aspect or a transceiver arrangement of the second aspect.

BRIEF DESCRIPTION OF THE DRAWINGS

In the following examples are described in more detail with reference to the attached figures and drawings, in which.

In the following identical reference signs refer to identical or at least functionally equivalent features.

DETAILED DESCRIPTION OF ILLUSTRATIVE EMBODIMENTS

In the following description, reference is made to the accompanying drawings, which form part of the disclosure, and in which are shown, by way of illustration, specific aspects and examples in which the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims. Further, it is understood that the features of the various exemplary aspects described herein may be combined with each other, unless specifically noted otherwise.

The purpose of the solution is to provide an improved duplex filter architecture that would at least one of reduce both transmitter and receiver losses, reduce cost or size, and increase transmitter-receiver isolation.

Figure 1A:
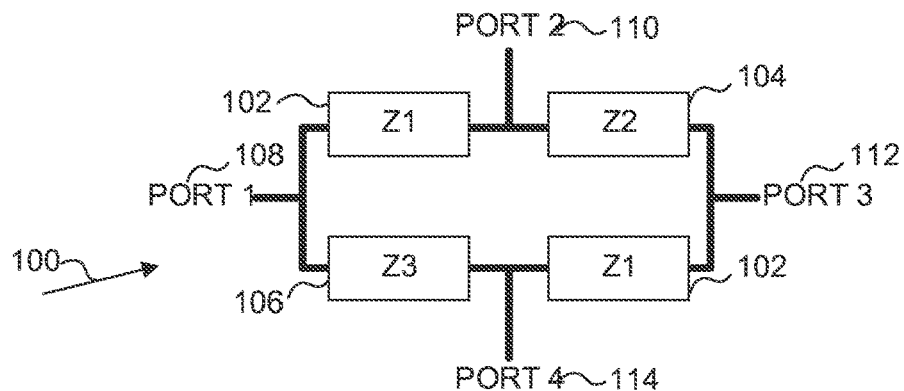
FIG. 1A is a block diagram which schematically illustrates a duplex filter arrangement for frequency-division duplex (FDD) communication according to an embodiment.

FIG. 1A is a block diagram which schematically illustrates a duplex filter arrangement 100 for frequency-division duplex (FDD) communication according to an embodiment. The duplex filter arrangement 100 comprises a first radio frequency port 108, a second radio frequency port no configured to be connected to an antenna, a third radio frequency port 112 and a fourth radio frequency port 114 configured to be connected to a balancing circuit. The duplex filter arrangement 100 further comprises a filtering arrangement comprising filters 102 of a first type, a filter 104 of a second type and a filter 106 of a third type. The filters 102, 104, 106 connect the first radio frequency port 102, the second radio frequency port no, the third radio frequency port 112 and the fourth radio frequency port 114.

The filters 102 of the first type are configured to pass signals at a first frequency band and reject signals at a second frequency band. A first filter of the filters 102 of the first type is connected between the first radio frequency port 108 and the second radio frequency port no and a second filter of the filters 102 of the first type is connected between the third radio frequency port 112 and the fourth radio frequency port 114.

The filter 104 of the second type is configured to reject signals at the first frequency band and pass signals at the second frequency band. The filter 104 of the second type is connected between the third radio frequency port 112 and the second radio frequency port no.

The filter 106 of the third type is configured to reject signals at the first frequency band and pass signals at the second frequency band. The filter 106 of the third type is connected between the first radio frequency port 108 and the fourth radio frequency port 114. The phase response of the filter 104 of the second type differs at the first frequency band and at the second frequency band substantially 180 degrees from the phase response of the filter 106 of the third type. The term "substantially 180 degrees" may mean that although an exact 180 degree phase difference may be desired, it may be difficult to achieve. Therefore, the term "substantially 180 degrees" used in the application is intended to cover values that may slightly deviate from the 180 degrees. In one embodiment, the term "substantially 180 degrees" may refer to 180 degrees±20 degrees, preferably 180 degrees±10 degrees and even more preferably 180 degrees±5 degree.

Impedance at the fourth radio frequency port 114 is configured to be at least substantially equal to the impedance at the second radio frequency port no at the first frequency band and at the second frequency band. When the phase response of the filter 104 of the second type differs at the first frequency band and at the second frequency band substantially 180 degrees from the phase response of the filter 106 of the third type and when the impedance at the fourth radio frequency port 114 equals to the impedance at the second radio frequency port no, transmitter (TX) leakage at the third radio frequency port 112 cancels.

In existing solutions using a similar architecture, baluns have been used for radio frequency elements connected to the first and third radio frequency ports, i.e. for a transmitter (TX) and a receiver (RX). Further, in the existing solutions the baluns introduce loss without any additional functionality or benefit. Further, a wide-band balun has to be based on a tightly coupled transformer, where primary and secondary loops have to be close to each other forming substantial capacitance. TX coupling through that capacitance is not cancelled in the duplexer, and this limits the TX-RX isolation.

In the solution disclosed in FIG. 1A, transformer equivalent circuits may be embedded into the designs of the filters 104 and 106. The 180 degree phase shift may be achieved due to the opposite connection to the transformers. Further, due to the additional TX-RX isolation from the TX leakage cancellation, requirements for the filters Z1, Z2, and Z3 are relaxed. As an example, very simple LC filters, or low order bulk acoustic wave (BAW) resonator filters, or low cost surface acoustic wave (SAW) filters can be used, instead of expensive state-of-the-art SAW/BAW filters.

Further, in the disclosed duplex filter arrangement 100, transmitter and receiver pass-band losses are determined by the filters of the first type (Z1) and the filter of the second type (Z2) and the filter of the third type (Z3), respectively, which can be zero with ideal components, and very small with realistic components. Further, Z2 and Z3 attenuate TX leaking to RX even if the balancing circuit connected to the fourth radio frequency port 114 is completely wrong. Due to this there is no risk of breaking the RX circuitry. Further, due to the additional filtering from Z1 and Z2, the balancing circuit needs to match to an impedance of the antenna with only about 20% accuracy. Further, due to Z2, only a small part of TX leaks to the balancing circuit. This means that the balancing circuit does not need to tolerate a large TX power.

Further, the transformers may be loosely coupled, which minimizes the transformer parasitics. Especially the capacitance between the primary and secondary loops can be negligible in a loosely coupled transformer, which improves the achievable transmitter-receiver isolation, since the capacitively coupled leakage through the transformers is not cancelled in the duplexer. Additionally, the reduced amount of parasitics may simplify the transformer design. Further, it may be possible to use thicker and wider metals in loosely coupled transformers than tightly coupled transformers thus reducing loss.

In known solutions, discrete filter components may be integrated into a front-end module (FEM), but then the FEM becomes very complex and expensive. The solution illustrated in FIG. 1A enables, for example, reducing the number of expensive discrete surface acoustic wave (SAW)/bulk acoustic wave (BAW) duplex filter components inside the FEM, or enables the use of lower cost duplex filter technology (for example, lower cost SAW/BAW or integrated passive device (IPD) filters), or enables a tunable duplex filter that can be configured to support multiple bands.

Figure 1B:
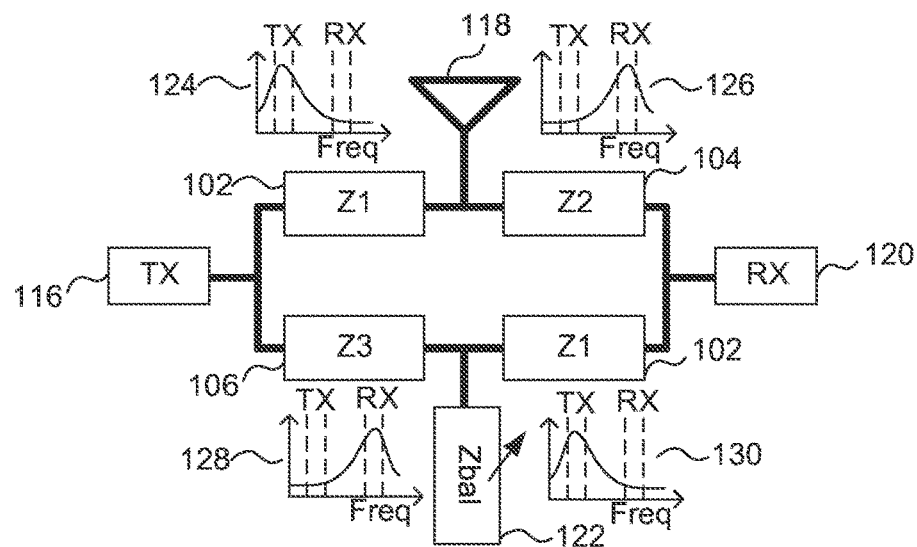
FIG. 1B illustrates a block diagram of a transceiver arrangement using the duplex filtering arrangement of FIG. 1A according to an embodiment.

FIG. 1B illustrates a block diagram of a transceiver arrangement using the duplex filtering arrangement 100 of FIG. 1A according to an embodiment. In FIG. 1B a transmitter 116 is connected to the first radio frequency port 108, a receiver 120 is connected to the third radio frequency port 112, an antenna 118 is connected to the second radio frequency port and a balancing impedance 122 is connected to the fourth radio frequency port 114. An impedance of the balancing circuit 122 seen at the fourth radio frequency port 114 replicates an impedance of the antenna 118 seen at the second radio frequency port no. The replicating may mean, for example, that the impedance of the balancing circuit 122 seen at the fourth radio frequency port 114 is substantially equal with the impedance of the antenna 118 seen at the second radio frequency port no at the first frequency band and at the second frequency band.

Graphs 124 and 130 illustrate that the filters 102 of the first type are configured to pass signals at a transmitter frequency band and reject signals at a receiver frequency band. Similarly, graphs 126 and 128 illustrate that the filters 104, 106 of the second and third type are configured to pass signals at the receiver frequency band and reject signals at the transmitter frequency band. In other words, Z1 filters pass the transmitter frequency band and form a high impedance block for the receiver frequency band. The Z2 and Z3 filters pass the receiver frequency band and form a high impedance block for the transmitter frequency band.

As already discussed above, due to the balancing impedance 122, impedance at the fourth radio frequency port 114 is substantially equal to the impedance at the second radio frequency port no at the first frequency band and at the second frequency band. When the phase response of the filter 104 of the second type differs at the first frequency band and at the second frequency band substantially 180 degrees from the phase response of the filter 106 of the third type and when the impedance at the fourth radio frequency port 114 equals to the impedance at the second radio frequency port no, transmitter (TX) leakage at the third radio frequency port 112 cancels. The balancing impedance 122 mimics an antenna impedance seen at the second radio frequency port no at TX frequency band and RX frequency band. Depending on the requirements, the balancing impedance 122 equals to the antenna impedance, for example, with better than 20%, 10%, or 5% accuracy.

Figure 1C:
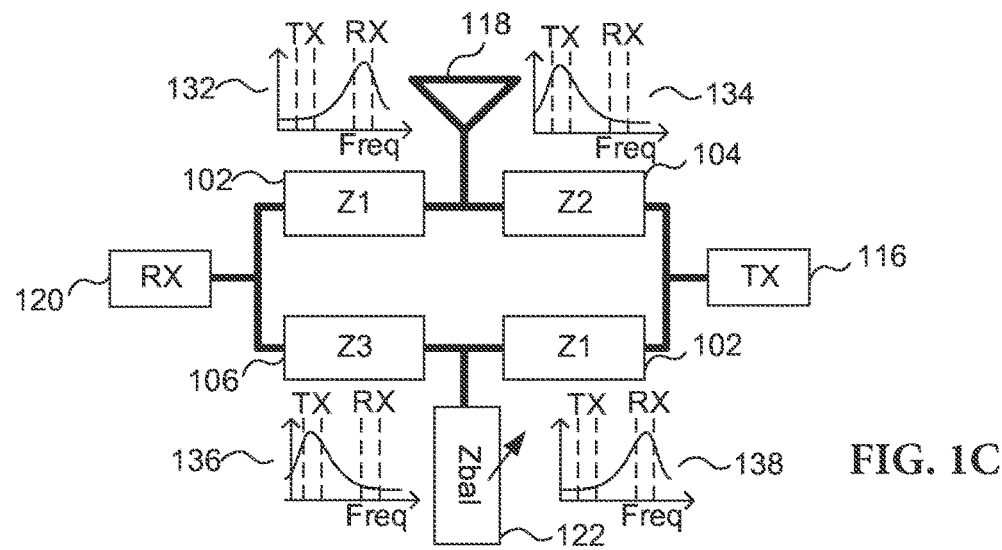
FIG. 1C illustrates another block diagram of a transceiver arrangement using the duplex filtering arrangement of FIG. 1A according to an embodiment.

FIG. 1C illustrates another block diagram of a transceiver arrangement using the duplex filtering arrangement 100 of FIG. 1A according to an embodiment. In FIG. 1B the receiver 120 is connected to the first radio frequency port 108, the transmitter 116 is connected to the third radio frequency port 112, the antenna 118 is connected to the second radio frequency port and the balancing impedance 122 is connected to the fourth radio frequency port 114.

Graphs 132 and 138 illustrate that the filters 102 of the first type are configured to reject signals at the transmitter frequency band and pass signals at the receiver frequency band. Similarly, graphs 134 and 136 illustrate that the filters 104, 106 of the first and second type are configured to pass signals at the transmitter frequency band and reject signals at the receiver frequency band. In other words, Z1 filters pass the receiver frequency band and form a high impedance block for the transmitter frequency band. The Z2 and Z3 filters pass the transmitter frequency band and form a high impedance block for the receiver frequency band.

Again, impedance at the fourth radio frequency port 114 is configured to be substantially equal to the impedance at the second radio frequency port no at the first frequency band and at the second frequency band. When the phase response of the filter 104 of the second type differs at the first frequency band and at the second frequency band substantially 180 degrees from the phase response of the filter 106 of the third type and when the impedance at the fourth radio frequency port 114 equals to the impedance at the second radio frequency port no, transmitter (TX) leakage at the first radio frequency port 108 cancels.

Figure 2:
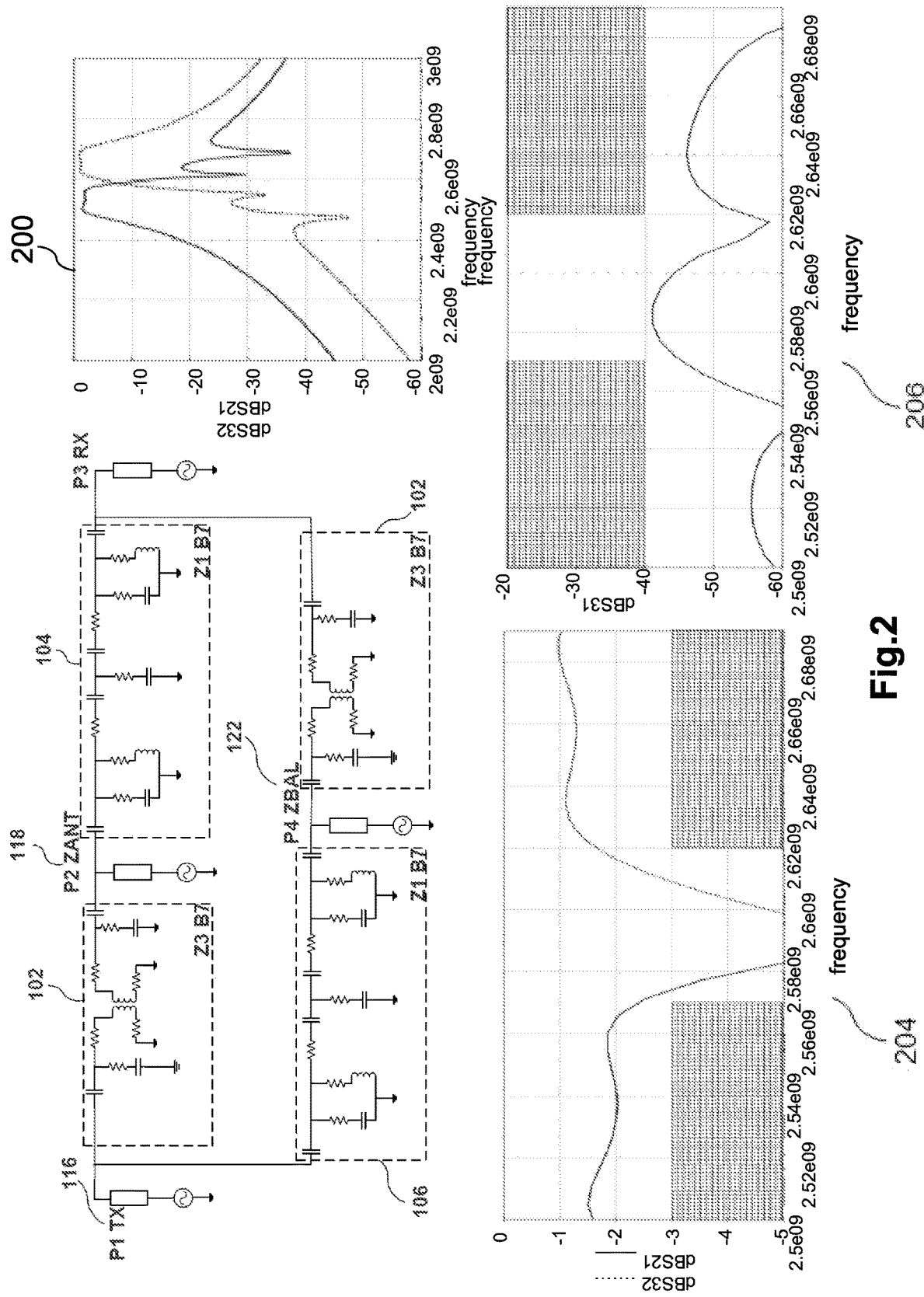
FIG. 2 illustrates an example implementation for the transceiver arrangement illustrated in FIG. 1B.

FIG. 2 illustrates an example implementation for the duplex filtering arrangement illustrated in FIG. 1B. FIG. 2 illustrates exemplary values for various components, for example, resistances, capacitors and transformers. The graph 200 illustrates gains from the transmitter to the antenna, and from the antenna to the receiver. The graph 204 illustrates gains from the transmitter to the antenna, and from the antenna to the receiver in the band 7. The graph 206 illustrates gains from the transmitter to the receiver in the band 7. In the illustrated example, balancing circuit impedance is 55 ohms and antenna impedance is 50 ohm. This means that the balancing circuit impedance differs 10% from the ideal value, but the TX-RX isolation is still over 40 dB.

Figure 3A:
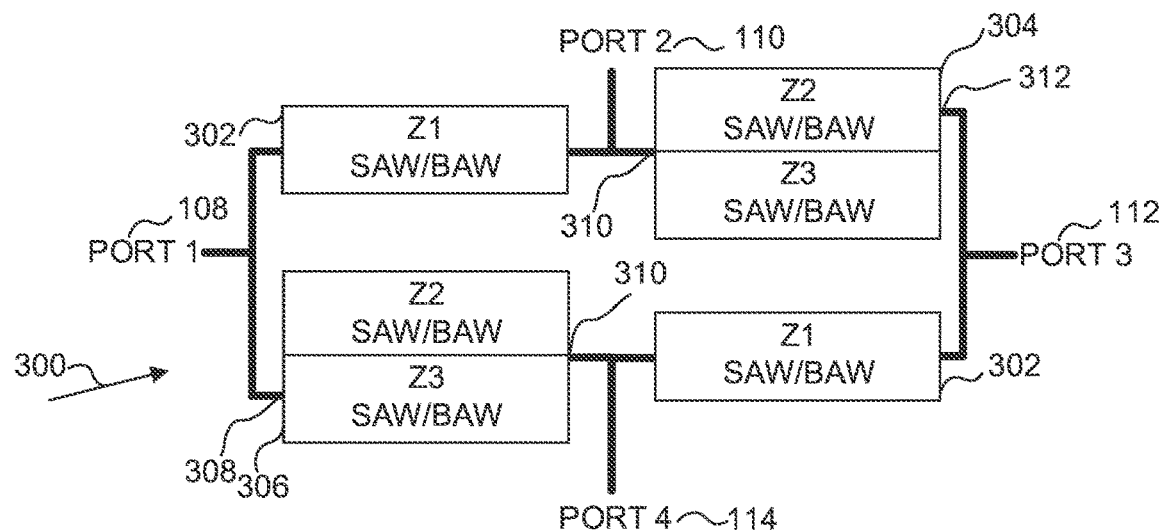
FIG. 3A is a block diagram which schematically illustrates a duplex filter arrangement for frequency-division duplex communication according to an embodiment.

FIG. 3A is a block diagram which schematically illustrates a duplex filter arrangement 300 for frequency-division duplex (FDD) communication according to an embodiment. FIG. 3A illustrates an embodiment where the filters 102, 104, 106 of the first, second and third type have been implemented using surface acoustic wave filters or a bulk acoustic wave filters 302, 304, 306. Z2 and Z3 are otherwise equal, but the Z3 embeds a 180 degree phase shift compared to Z2. Filters Z2 and Z3 embed a balun functionality from a common port 310 to a port 312 of Z2 and a port 308 of Z3, meaning that there is a 180 degree phase difference between the filters.

Figure 3B:
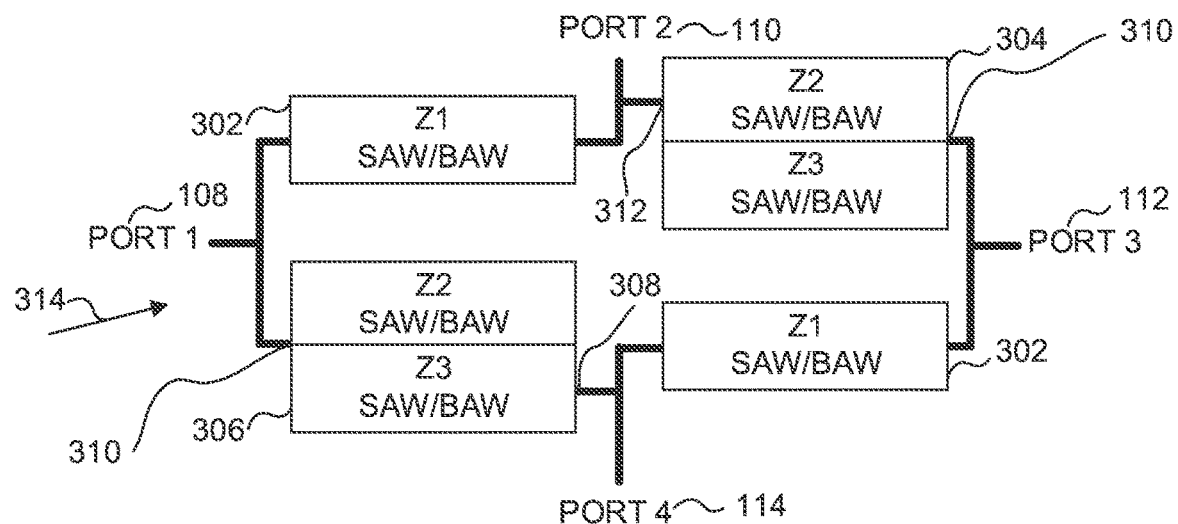
FIG. 3B is another block diagram which schematically illustrates a duplex filter arrangement for frequency-division duplex communication according to an embodiment.

FIG. 3B is another block diagram which schematically illustrates a duplex filter arrangement 314 for frequency-division duplex communication according to an embodiment. FIG. 3B illustrates an embodiment where the filters 102, 104, 106 of the first, second and third type have been implemented using surface acoustic wave filters or a bulk acoustic wave filters 302, 304, 306. Z2 and Z3 are otherwise equal, but the Z3 embeds a 180 degree phase shift compared to Z2. The reference 310 again indicates a common port for Z2 and Z3. Further, the embodiment in FIG. 3B illustrates that a low-cost filter, which itself has inadequate rejection, can be used. By using such a filter lower fabrication costs, easier fabrication, or lower pass-band insertion loss may be achieved. Filters Z2 and Z3 embed a balun functionality from the common port 310 to the ports 308 and 312, meaning that there is a 180 degree phase difference between the filters.

Figure 4A:
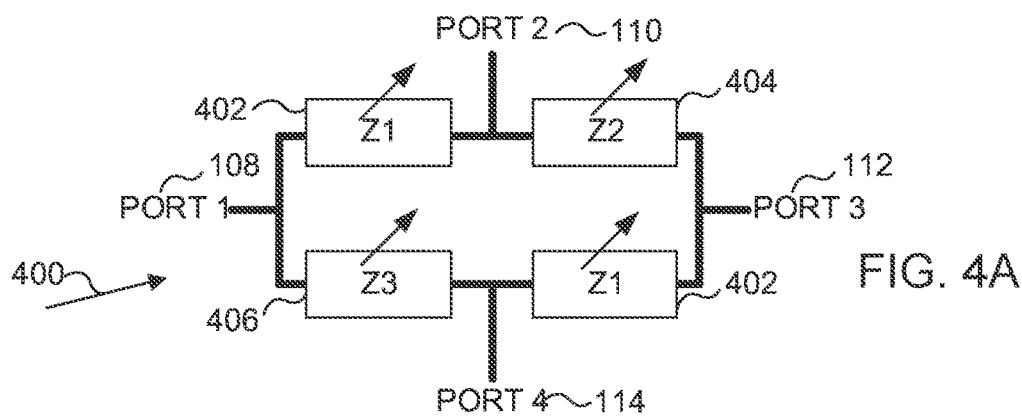
FIG. 4A is a block diagram which schematically illustrates a duplex filter arrangement for frequency-division duplex communication.

FIG. 4A is a block diagram which schematically illustrates a duplex filter arrangement 400 for frequency-division duplex communication. The embodiment illustrated in FIG. 4A differs from the embodiment illustrated in FIG. 1A in that in FIG. 4 filters 402, 404, 406 may comprise tunable elements. The tunable elements can be used to configure the duplexer arrangement 400 to different frequency bands. The tunable elements may comprise, for example, at least one of a programmable array of switchable capacitors, varactors, diodes, switchable inductors, etc.

Figure 4B:
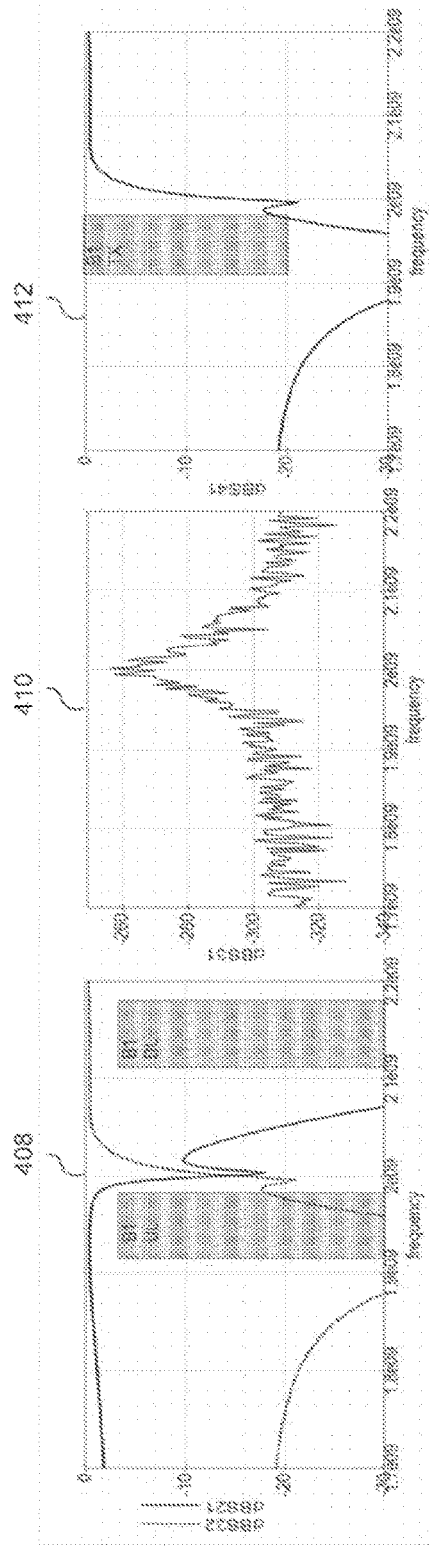
FIG. 4B illustrates an implementation example of the duplex filter arrangement of FIG. 4A.
Figure 4B:
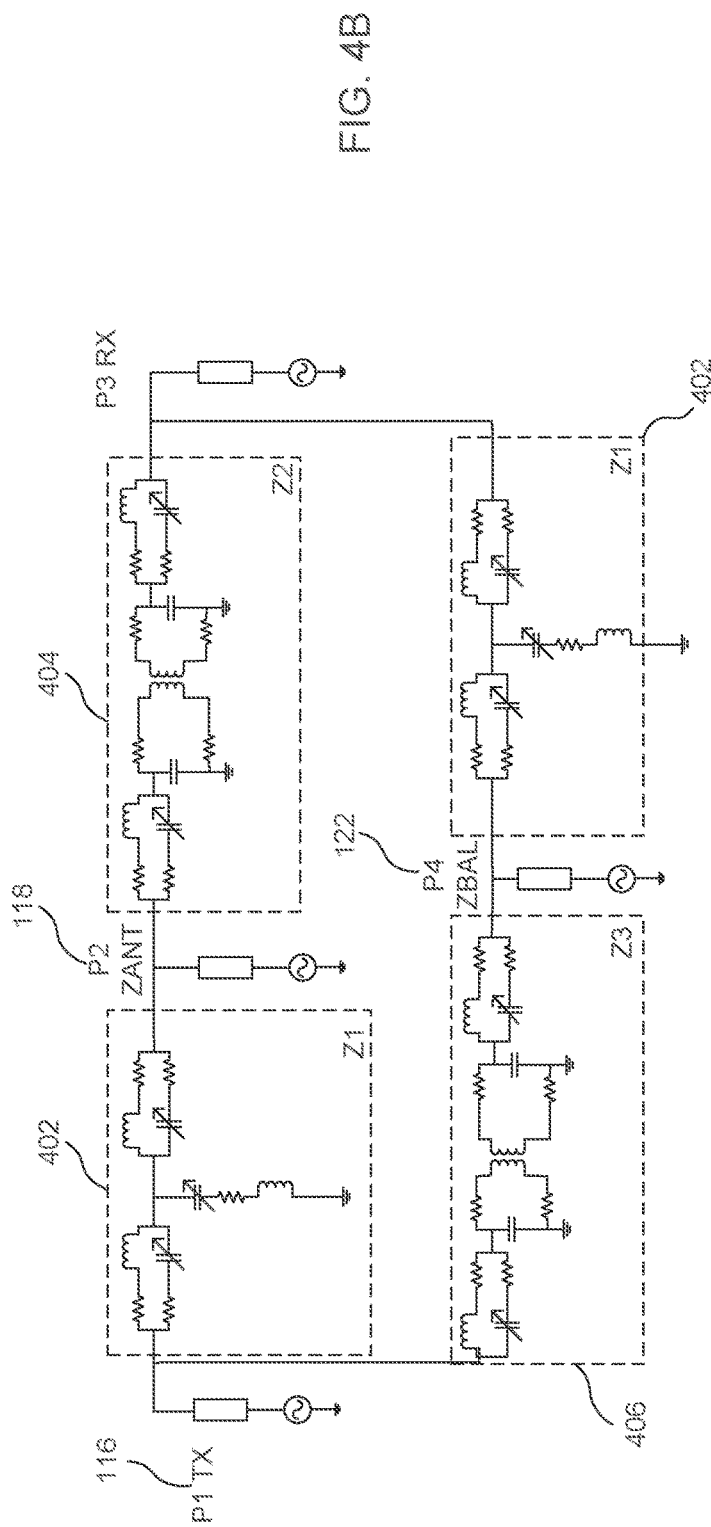

FIG. 4B illustrates an implementation example of the duplex filter arrangement 400 of FIG. 4A. The first radio frequency port is connected to the transmitter 116, the second radio frequency port is connected to the antenna 118, the third radio frequency port is connected to the receiver 120, and the fourth radio frequency port is connected to the balancing impedance 122. The arrows within the filters 402, 404, 406 indicate tunable elements. In this embodiment, the tunable elements may comprise capacitors.

The graphs 408, 410 and 412 illustrate gain examples when the values of the capacitors are the ones illustrated in FIG. 4B. As can be seen from the graph 408, the loss from the first radio frequency port to the second radio frequency port is less than 3 dB at the transmitter frequency band Bi UL (1.92-1.98 GHz) and the loss from the second radio frequency port to the third radio frequency port is less than 3 dB at the receiver frequency band Bi DL (2.11-2.17 GHz). The filters 404, 406 (Z2 and Z3) have a 180 degree phase difference from the opposite connection to the transformers. The transformers are part of the filters 404, 406 (Z2 and Z3), and the coupling coefficients are only 0.45. The equivalent circuits of the loosely coupled transformers may be embedded as part of the filters 404, 406 (Z2 and Z3). The antenna and balancing impedances are equal in this embodiment, so the transmitter-receiver isolation is perfect in this optimal case.

Figure 4C:
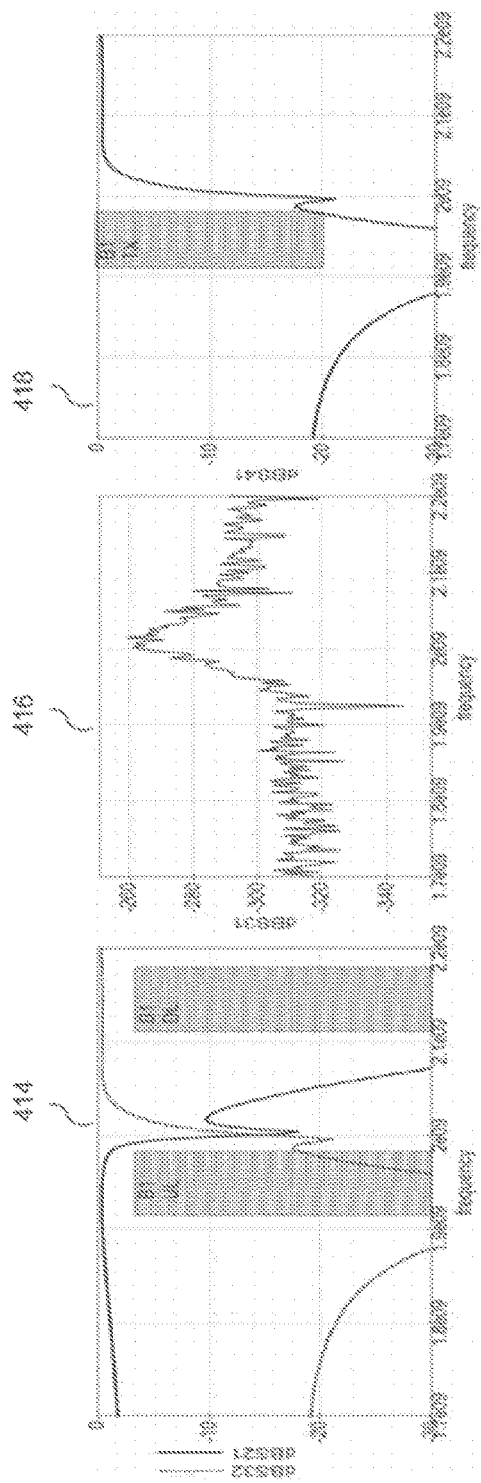
FIG. 4C illustrates a further implementation example of the duplex filter arrangement illustrated in FIG. 4B.
Figure 4C:
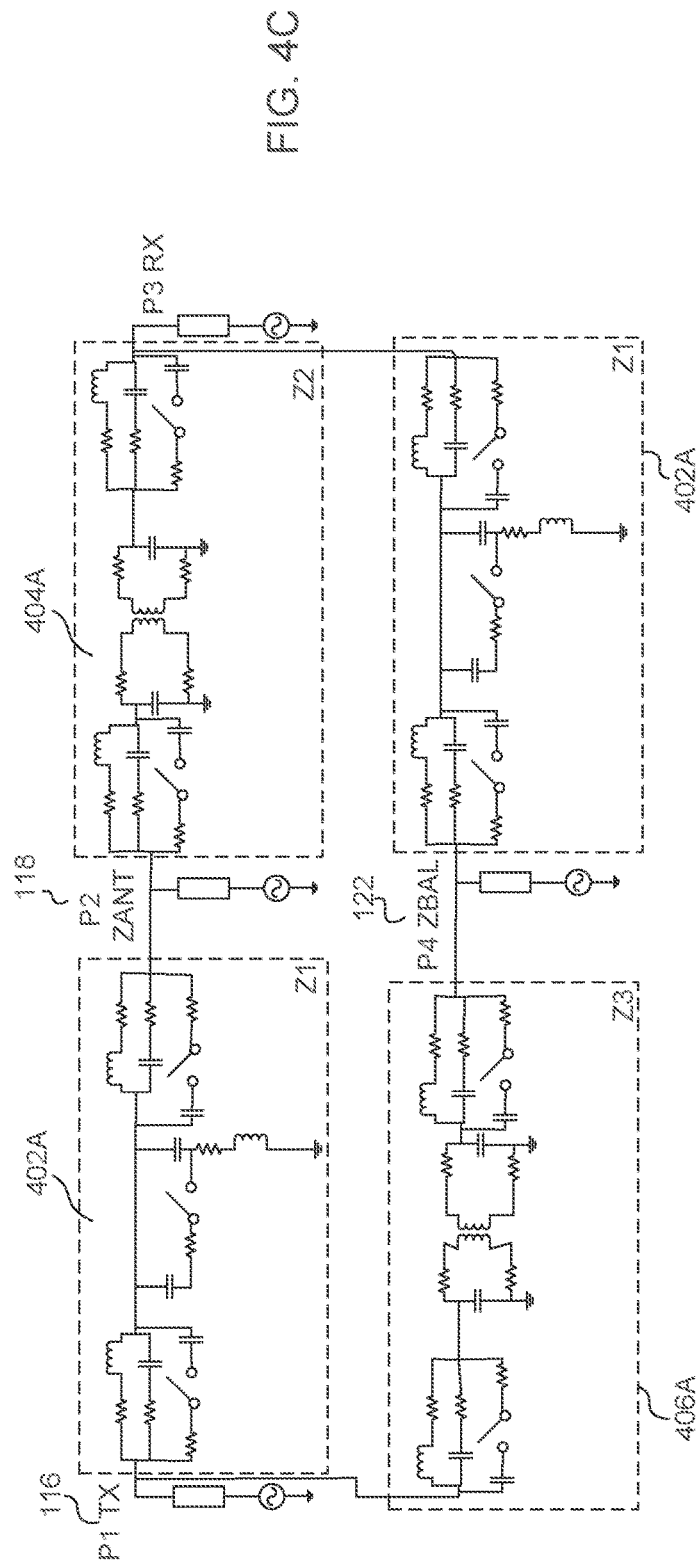

FIG. 4C illustrates a further implementation example of the duplex filter arrangement 400 illustrated in FIG. 4A. The tunable capacitors in filters 402A, 404A, 406A can be implemented using capacitors and switches. In FIG. 4C, when the switches are OFF, the duplex filter arrangement supports the Long-Term Evolution (LTE) band 1. In a further embodiment, each of the switchable capacitors may be a bank of small switchable capacitors in order to support more than two bands. Graphs 414, 416, 418 illustrate various gains associated with the illustrated implementation example. Further, the duplex filter may be fine-tuned, for example, to compensate device variation. Using the principle illustrated in FIG. 4C, multiple FDD frequency bands can be supported using programmable capacitors.

Figure 4D:
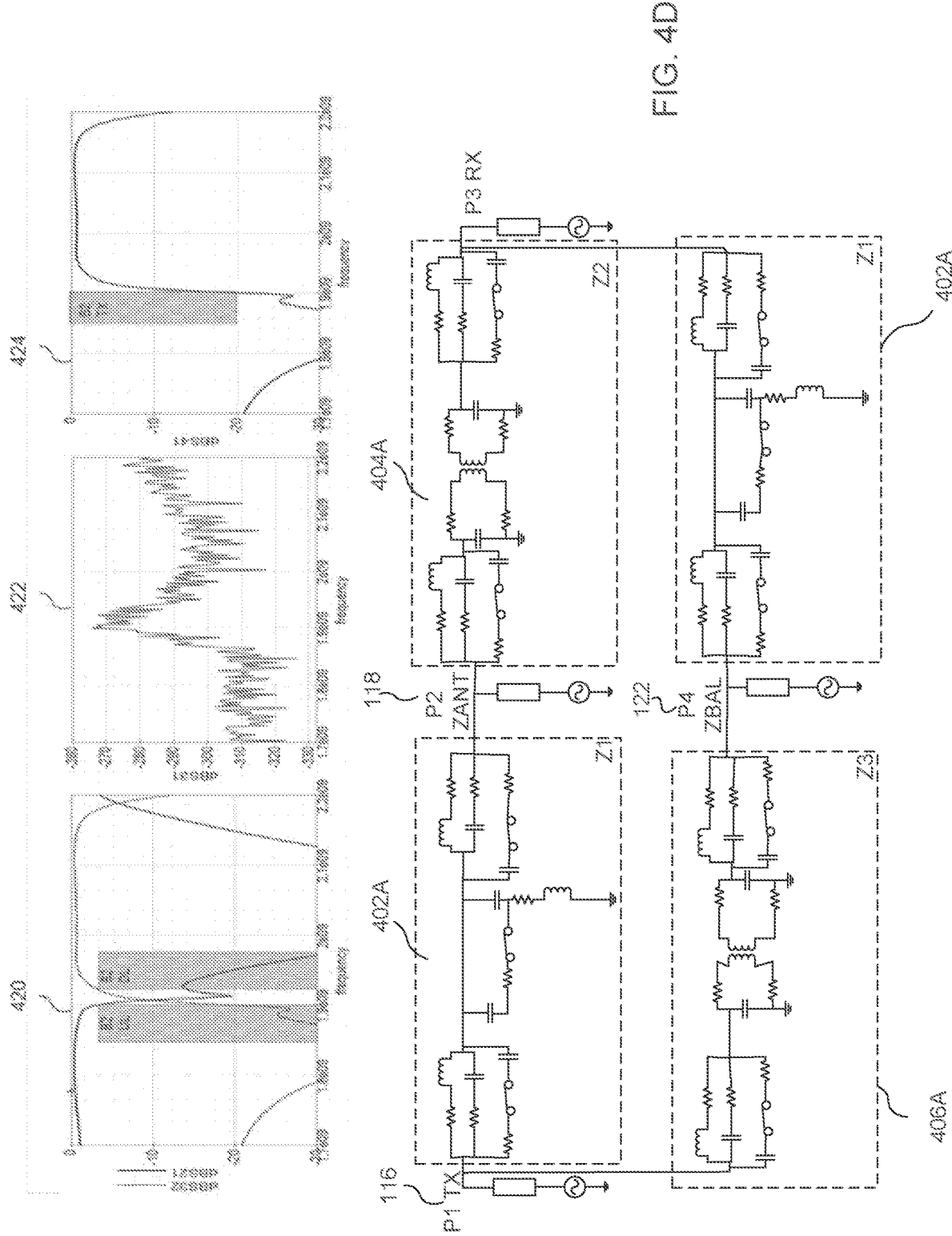
FIG. 4D illustrates a further implementation example of the duplex filter arrangement illustrated in FIG. 4B.

The embodiment illustrated in FIG. 4D is identical with the embodiment illustrated in FIG. 4C with the exception that the switches are ON. Now the duplex arrangement supports the LTE band 2. Graphs 420, 422, 424 illustrate various gains associated with the illustrated implementation example.

Figure 5A:
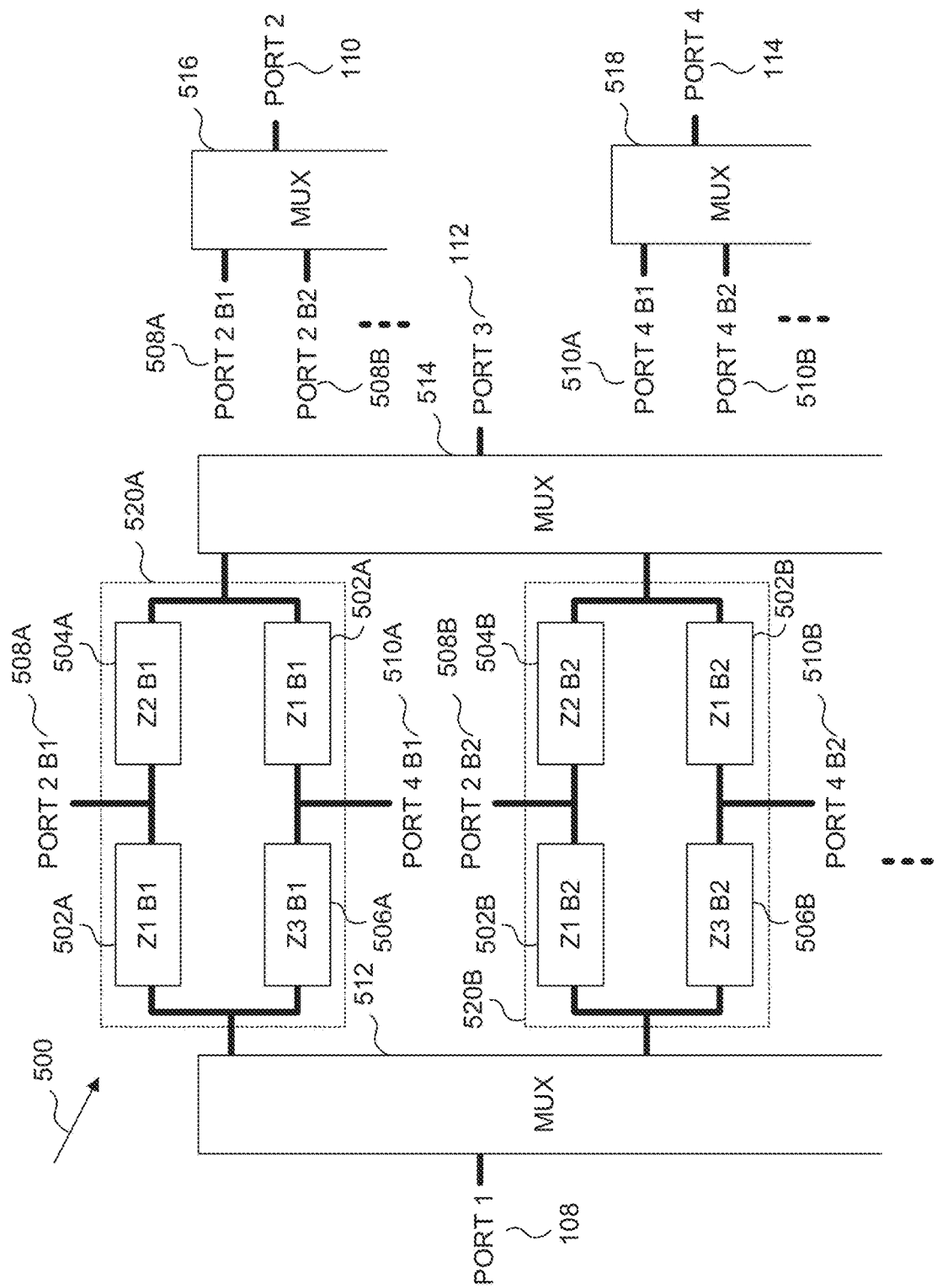
FIG. 5A is a block diagram which schematically illustrates a duplex filter arrangement for frequency-division duplex communication according to an embodiment.

FIG. 5A is a block diagram which schematically illustrates a duplex filter arrangement 500 for frequency-division duplex communication according to an embodiment. The duplex filter arrangement 500 comprises multiple duplex filter arrangements 100 illustrated in FIG. 1A. These duplex filter arrangements are called in this embodiment as sub-arrangements 520A, 520B.

Each sub-arrangement 520A, 520B is connected to the first radio frequency port 108, the second radio frequency port no configured to be connected to an antenna, the third radio frequency port 112 and the fourth radio frequency port 114 configured to be connected to a balancing circuit via a plurality of multiplexers 512, 514, 516, 518. As can be seen from FIG. 5A, each multiplexer of the plurality of multiplexers 512, 514, 516, 518 provides the each sub-arrangement 520A, 520B with a connection to one radio frequency port.

The multiplexer 512 provides a connection to the first radio frequency port 108 and the multiplexer 514 provides a connection to the third radio frequency port 112. Similarly, the multiplexer 516 provides a connection to the second radio frequency port no and the multiplexer 518 provides a connection to the fourth radio frequency port 114. The sub-arrangements 520A, 520B further comprise filters 502A, 502B of a first type, a filter 504A, 504B of a second type and a filter 506A, 506B of a third type. The filters 502A, 502B, 504A, 504B, 506A, 506B connect the first radio frequency port 108, the second radio frequency port 508A, 508B, the third radio frequency port 112 and the fourth radio frequency port 510A, 510B.

The filters 502A, 502B of the first type are configured to pass signals at a first frequency band and reject signals at a second frequency band, and a first filter of the filters 502A, 502B of the first type is connected between the first radio frequency port 108 and the second radio frequency port 508A, 508B and a second filter of the filters 502A, 502B of the first type is connected between the third radio frequency port 112 and fourth radio frequency port 510A, 510B.

The filter 504A, 504B of the second type is configured to reject signals at the first frequency band and pass signals at the second frequency band, and the filter 504A, 504B of the second type is connected between the third radio frequency port 112 and the second radio frequency port 508A, 508B.

The filter 506A, 506B of the third type is configured to reject signals at the first frequency band and pass signals at the second frequency band, and the filter 506A, 506B of the third type is connected between the first radio frequency port 108 and the fourth radio frequency port 510A, 510B. The phase response of the filter 504A, 504B of the second type differs at the first frequency band and at the second frequency band substantially 180 degrees from the phase response of the filter 506A, 506B of the third type. The term "substantially 180 degrees" may mean that although an exact 180 degree phase difference may be desired, it may be difficult to achieve. Therefore, the term "substantially 180 degrees" used in the application is intended to cover values that may slightly deviate from the 180 degrees. In one embodiment, the term "substantially 180 degrees" may refer to 180 degrees±20 degrees, preferably 180 degrees±10 degrees and even more preferably 180 degrees±5 degree.

Using the multiplexers 512, 514, 516, 518, one of the sub-arrangements 520A, 520B can be selected at a time. In an embodiment, a separate sub-arrangement may be arranged for each band.

In an embodiment, the sub-arrangements may be implemented as discrete components or they can be integrated on a single chip. Since the filters can be based on integrated passive electrical components (capacitors, inductors, transformers, instead of acoustic electromechanical devices), the filters can be easily integrated on single chip, which is very cost-effective.

In an embodiment, the multiplexers 512, 514, 516, 518 may be integrated on the same chip as the filters. In another embodiment, the multiplexers 512, 514, 516, 518 may be on one or several separate chips.

Although FIG. 5A illustrates only two sub-arrangements 520A, 520B, in other embodiments, there may be any number of sub-arrangements.

Figure 5B:
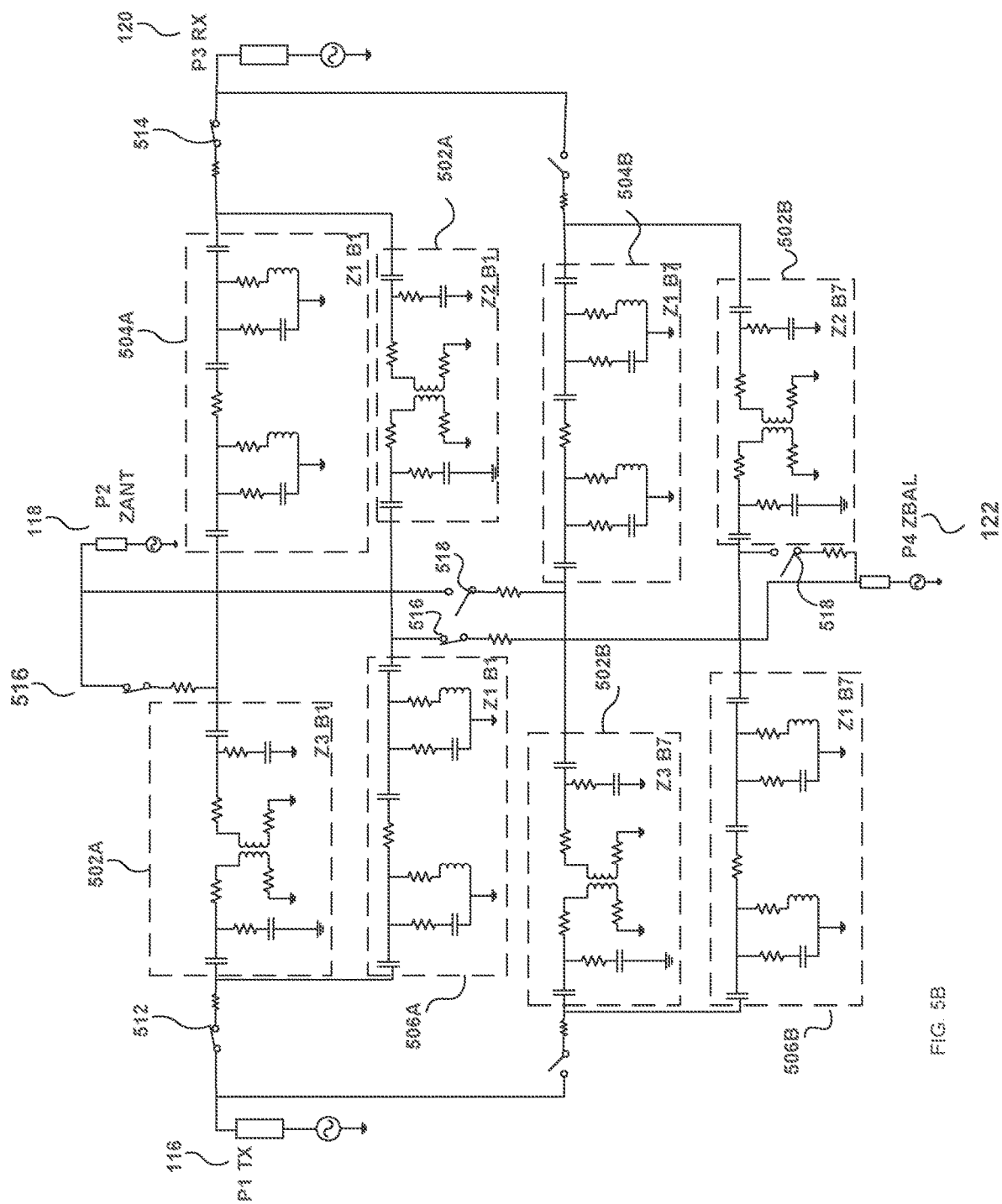
FIG. 5B illustrates an example implementation of the duplex filter arrangement illustrated in FIG. 5A.

FIG. 5B illustrates an example implementation of the duplex filter arrangement 500 illustrated in FIG. 5A. FIG. 5B illustrates exemplary values for various components, for example, resistances, capacitors and transformers. In FIG. 5B, the switches are set to support LTE band 1, but the switches can also be set to support LTE band 7.

Figure 6A:
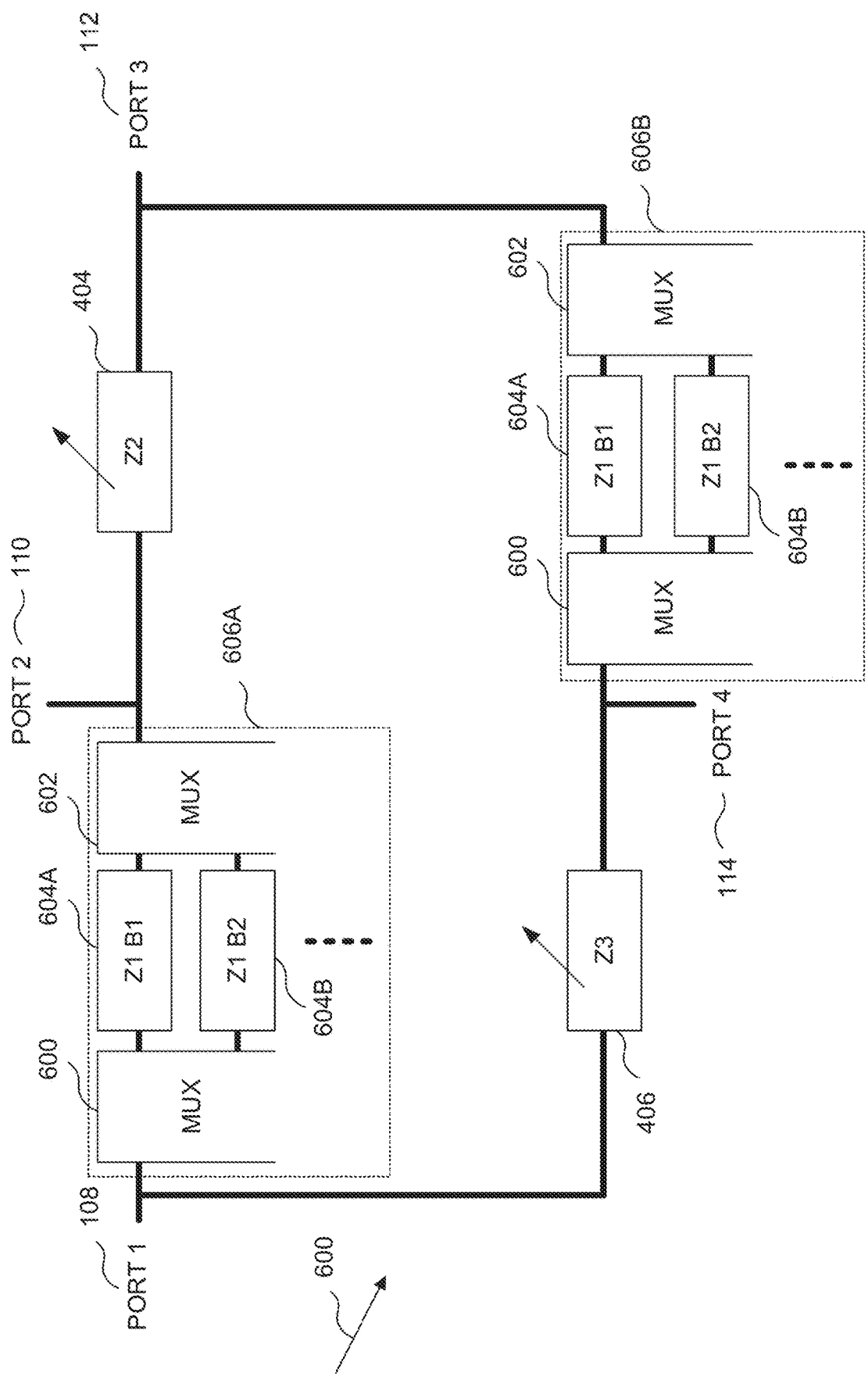
FIG. 6A is a block diagram which schematically illustrates a duplex filter arrangement for frequency-division duplex communication according to an embodiment.

FIG. 6A is a block diagram which schematically illustrates a duplex filter arrangement 600 for frequency-division duplex communication according to an embodiment. The embodiment illustrated in FIG. 6A differs from the embodiment illustrated in FIG. 4A in that in FIG. 6A the filters 402 of the first type of FIG. 4A are replaced with a filter 606A comprising a group of filter elements 604A, 604B and two multiplexers 600, 602 connected to each filter element 604A, 604B. The multiplexers 600, 602 are configured to select one filter element 604A, 604B a time.

As illustrated in FIG. 6A, the filter elements 604A, 604B are band-specific and the filters 404, 406 are tunable. In one embodiment, the filter elements 604A, 604B may have tighter requirements, while the filters 404, 406 may be lower order filters enabling the use of tunable elements to support multiple frequency bands.

Although FIG. 6A illustrates only two filter elements 604A, 604B, in other embodiments there may be any number of filter elements.

Figure 6B:
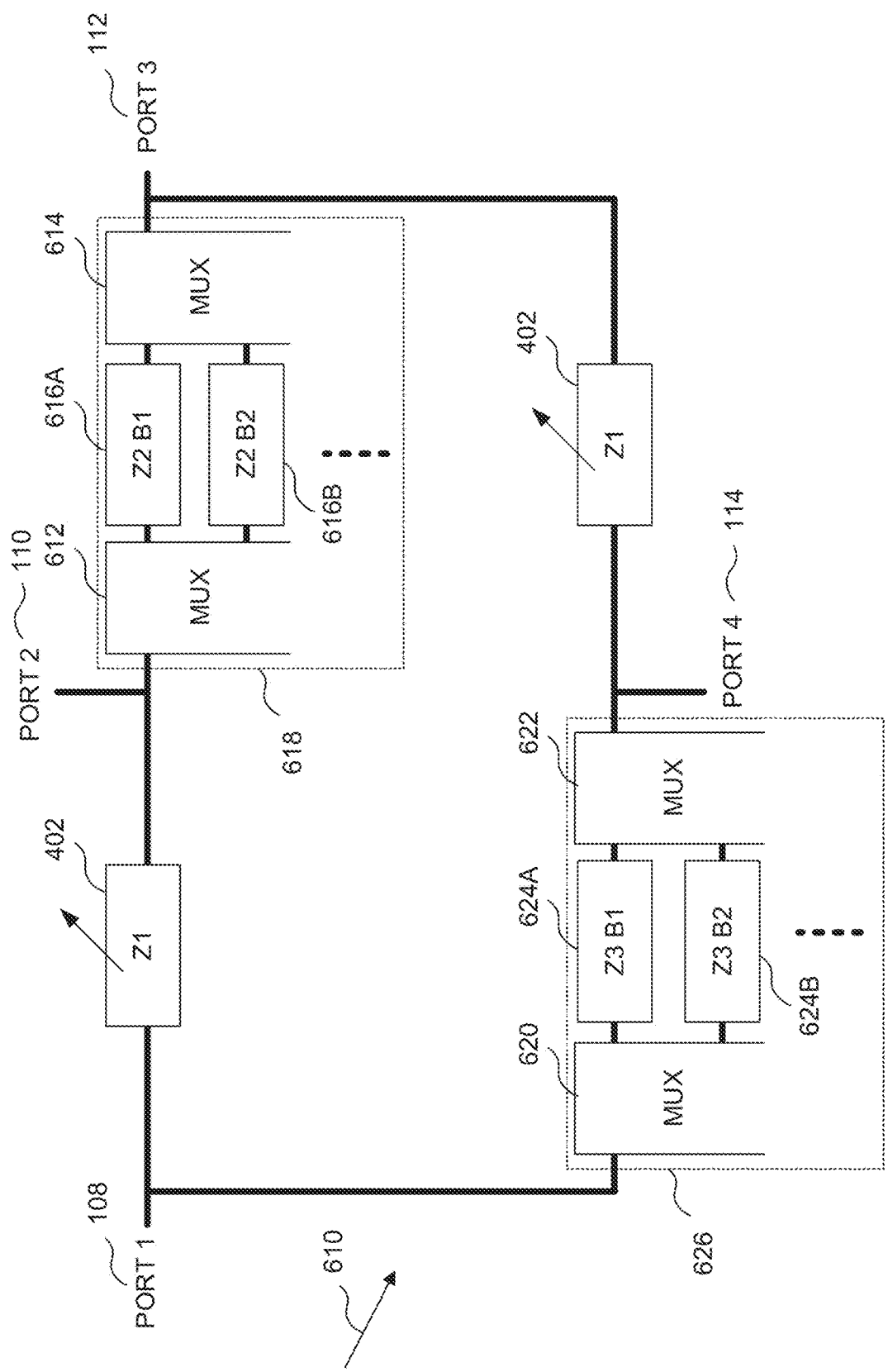
FIG. 6B is a block diagram which schematically illustrates a duplex filter arrangement for frequency-division duplex communication according to an embodiment.

FIG. 6B is a block diagram which schematically illustrates a duplex filter arrangement 610 for frequency-division duplex communication according to an embodiment. The embodiment illustrated in FIG. 6B differs from the embodiment illustrated in FIG. 4A in that in FIG. 6B the filter 402 of the second type of FIG. 4A is replaced with a filter 618 comprising a group of filter elements 616A, 616B and two multiplexers 612, 614 connected to each filter element 616A, 616B. Using the multiplexers 612, 614 it is possible to select one filter element 616A, 616B at a time. Each filter element 616A, 616B may be configured to support a separate frequency band. Similarly, the filter 404 of the third type of FIG. 4A is replaced with a filter 626 comprising a group of filter elements 624A, 624B and two multiplexers 620, 622 connected to each filter element 624A, 624B. Using the multiplexers 620, 622 it is possible to select one filter element 624A, 624B at a time. Each filter element 624A, 624B may be configured to support a separate frequency band.

As illustrated in FIG. 6B, the filter elements 616A, 616B are band-specific and the filters 402 are tunable. In one embodiment, SAW/BAW filters that embed the phase shift can be used as the filter elements 616A, 616B, 624A, 624B. The filters 402 can then be tunable, and they can be implemented without a transformer.

Although FIG. 6B illustrates only two filter elements 616A, 616B and 624A, 624B, in other embodiments there may be any number of filter elements.

According to another embodiment, a wireless device, for example, a mobile phone, a smart phone, a computer or a mobile device, may comprise any of the duplex filtering arrangements or transceiver arrangements discussed above.

Further, although the above examples and embodiments may have been presented with Long-Term Evolution (LTE) bands, LTE bands are only exemplary and the disclosed solution may apply also to bands of various wireless communication networks.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example or embodiment or may relate to several examples or embodiments. The examples or embodiments are not limited to those that solve any or all of the stated problems or those that have any or all of the stated benefits and advantages. It will further be understood that reference to 'an' item may refer to one or more of those items.

Aspects of any of the examples or embodiments described above may be combined with aspects of any of the other examples described to form further examples or embodiments without losing the effect sought.

The term 'comprising' is used herein to mean including the blocks or elements identified, but that such blocks or elements do not comprise an exclusive list and an apparatus may contain additional blocks or elements.

Although the invention and its advantages have been described in detail with reference to specific features and embodiments thereof, it is evident that various changes, modifications, substitutions, combinations and alterations can be made thereto without departing from the spirit and scope of the invention as defined by the appended claims. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An apparatus used for frequency-division duplex communication, comprising:
a first radio frequency port;
a second radio frequency port coupled to an antenna;
a third radio frequency port;
a fourth radio frequency port coupled to a balancing circuit;
a plurality of multiplexers; and
a filtering arrangement comprising filters of a first type, a filter of a second type and a filter of a third type,
wherein the filters of the first type are configured to pass signals at a first frequency band and reject signals at a second frequency band, and wherein a first filter of the filters of the first type is connected between the first radio frequency port and the second radio frequency port and a second filter of the filters of the first type is connected between the third radio frequency port and the fourth radio frequency port,
wherein the filter of the second type is configured to reject signals at the first frequency band and pass signals at the second frequency band, and wherein the filter of the second type is connected between the second radio frequency port and the third radio frequency port,
wherein the filter of the third type is configured to reject signals at the first frequency band and pass signals at the second frequency band, and wherein the filter of the third type is connected between the first radio frequency port and the fourth radio frequency port,
wherein a different multiplexer of the plurality of multiplexers is associated with each one of the first radio frequency port, the second radio frequency port, the third radio frequency port and the fourth radio frequency port, and each multiplexer of the plurality of multiplexers selectively connects the filtering arrangement to a radio frequency port of the first radio frequency port, the second radio frequency port, the third radio frequency port and the fourth radio frequency port according to a selected frequency band, and
wherein a phase response of the filter of the second type differs substantially 180 degrees from a phase response of the filter of the third type.

2. The apparatus of claim 1, wherein the phase response of the filter of the second type differs substantially 180 degrees from the phase response of the filter of the third type at the first frequency band.

3. The apparatus of claim 2, wherein the phase response of the filter of the second type differs substantially 180 degrees from the phase response of the filter of the third type at the second frequency band.

4. The apparatus of claim 1, wherein:
the first frequency band comprises a transmitter frequency band and the second frequency band comprises a receiver frequency band, and
the first radio frequency port is coupled to a transmitter and the third radio frequency port is coupled to a receiver.

5. The apparatus of claim 1, wherein:
the first frequency band comprises a receiver frequency band and the second frequency band comprises a transmitter frequency band, and the first radio frequency port is coupled to a receiver and the third radio frequency port is coupled to a transmitter.

6. The apparatus of claim 1, wherein at least one filter of the filters of the first, second and third type comprises tunable circuit elements, wherein the tunable circuit elements are used to provide multiple frequency bands.

7. The apparatus of claim 1, wherein at least one filter of the filters of the first, second and third type comprises a surface acoustic wave filter or a bulk acoustic wave filter.

8. The apparatus of claim 1, wherein each filter of the first type comprises a group of filter elements and two multiplexers connected to each filter element, the two multiplexers being configured to select one filter element at a time, and wherein each filter element is configured to support a separate frequency band.

9. The apparatus of claim 1, wherein:
the filter of the second type comprises a group of filter elements and two multiplexers connected to each filter element, the two multiplexers being configured to select one filter element at a time, and wherein each filter element is configured to support a separate frequency band, and
the filter of the third type comprises a group of filter elements and two multiplexers connected to each filter element, the two multiplexers being configured to select one filter element at a time, and wherein each filter element is configured to support a separate frequency band.

10. The apparatus of claim 1, further comprising:
a plurality of filtering arrangements comprising the filtering arrangement, wherein each filtering arrangement provides a separate frequency band, and wherein a different multiplexer of the plurality of multiplexers is associated with each one of the first radio frequency port, the second radio frequency port, the third radio frequency port and the fourth radio frequency port of each filtering arrangement of the plurality of filtering arrangements, and wherein each multiplexer of the plurality of multiplexers selectively provides a filtering arrangement of the plurality of filtering arrangements with a connection to one radio frequency port according to the selected frequency band.

11. The apparatus of claim 10, wherein the plurality of multiplexers is implemented using multiple chips.

12. The apparatus of claim 10, wherein the plurality of multiplexers is integrated on a single chip.

13. The apparatus of claim 1, wherein the filtering arrangement is implemented using multiple chips.

14. The apparatus of claim 1, wherein the filtering arrangement is implemented on a single chip.

15. The apparatus of claim 1, further comprising the antenna and the balancing circuit,
wherein the antenna is connected to the second radio frequency port and the balancing circuit is connected to the fourth radio frequency port, and
wherein an impedance of the balancing circuit at the fourth radio frequency port replicates an impedance of the antenna at the second radio frequency port.

* * * * *